(12) United States Patent
Omura et al.

(10) Patent No.: US 6,988,753 B1
(45) Date of Patent: Jan. 24, 2006

(54) BUMPER BEAM ATTACHMENT STRUCTURE FOR VEHICLE

(75) Inventors: Kazuo Omura, Wako (JP); Keiichi Honda, Wako (JP); Toshihiko Suzuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/174,878

(22) Filed: Jul. 5, 2005

(30) Foreign Application Priority Data

Jul. 20, 2000 (JP) .............................. 2004-211362
Jul. 20, 2004 (JP) .............................. 2004-211380

(51) Int. Cl.
*B60R 19/28* (2006.01)
(52) U.S. Cl. ........................................ 293/13; 293/155
(58) Field of Classification Search ................ 293/133, 293/132, 155, 154
See application file for complete search history.

(56) References Cited

U.S. PATENT DOCUMENTS 6,712,411 B2 * 3/2004 Gotanda et al. ............. 293/155
2005/0104393 A1 * 5/2005 Haneda et al. .............. 293/133

FOREIGN PATENT DOCUMENTS

JP 2001-058550 3/2001
JP 2004-155313 6/2004

* cited by examiner

*Primary Examiner*—Joseph D. Pape
(74) *Attorney, Agent, or Firm*—Rankin, Hill, Porter & Clark LLP

(57) ABSTRACT

A vehicle bumper beam attachment structure includes a shock-absorbing extension member through which a bumper beam is attached to a vehicle body. The extension member is formed from an aluminum extruded hollow profile and includes a rear wall for abutment with the vehicle body, an inner sidewall extending convexly from an inner end the rear wall toward the bumper beam, a central sidewall extending from a central portion of the rear wall in substantially the same direction as the inner sidewall, a first front wall connecting distal ends of the inner and central sidewalls, a branched sidewall branched off from the central sidewall and extending convexly toward the bumper beam, an outer sidewall extending from an outer end of the rear wall toward the bumper beam, and a second front wall connecting distal ends of the branched and outer sidewalls.

21 Claims, 13 Drawing Sheets

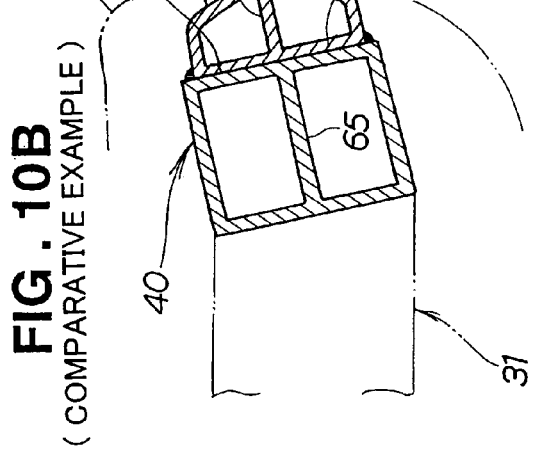
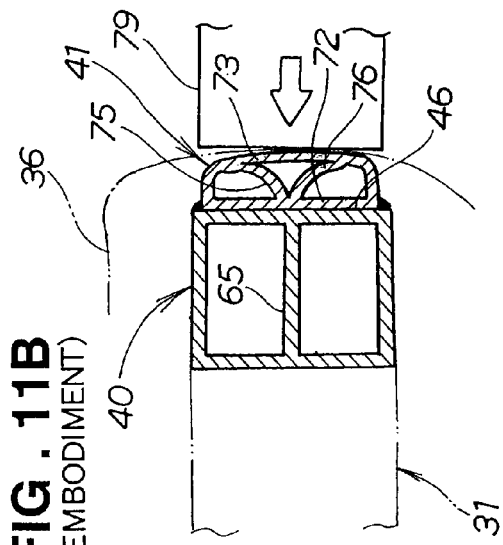
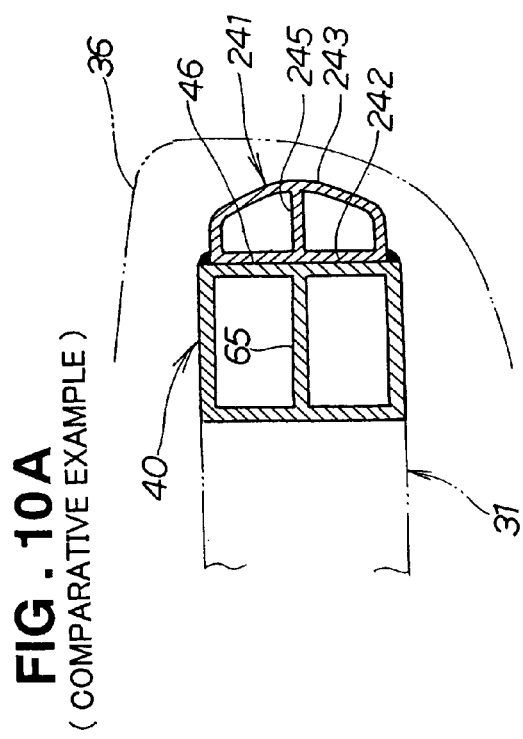
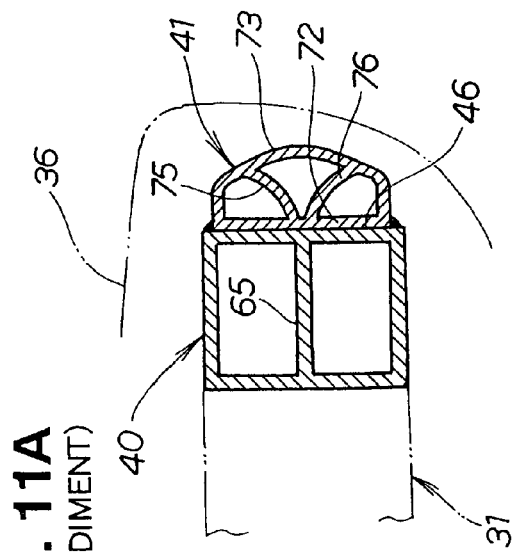

(COMPARATIVE EXAMPLE)

(COMPARATIVE EXAMPLE)

(COMPARATIVE EXAMPLE)

(EMBODIMENT)

(EMBODIMENT)

(EMBODIMENT)

BUMPER BEAM ATTACHMENT STRUCTURE FOR VEHICLE

FIELD OF THE INVENTION

The present invention relates to a bumper beam attachment structure including a bumper beam adapted to be attached to the body of a vehicle via extension members for absorbing an impact force applied to the bumper beam.

BACKGROUND OF THE INVENTION

Bumper beam attachment structures including a bumper beam attached to right and left side frames of the vehicle body via shock-absorbing extension members are known. One example of such known bumper beam attachment structures is disclosed in Japanese Patent Laid-open Publication (JP-A) No. 2001-58550.

The disclosed bumper beam attachment structure, as shown here in FIG. 17, includes a bumper beam 315 attached via a shock-absorbing extension member 314 to each of the right and left rear side frames (left one 311 being shown) of a vehicle body. For attachment, the rear side frame has a reinforcement panel 312 connected by welding to a rear end thereof, and a retaining member 313 connected by welding to the reinforcement panel 312. The extension member 314 is connected to the retaining member 313 by a screw fastener (not designated) so that the bumper beam 315 is attached to the left rear side frame 311 of the vehicle body. The extension member 314 is formed from a sheet metal and has a generally box-shaped configuration with one side 316 open and attached by welding to the bumper beam 315.

With the bumper beam attachment structure 310 thus arranged, when the bumper beam 315 is subjected to an impact force applied from the back of the vehicle body, opposite sidewalls 317 of the box-shaped extension member 314 undergo buckling to thereby absorb the impact force before the impact force is transmitted to the rear side frame 311. In this instance, however, since the impact force acts in a direction substantially parallel to respective general planes of the sidewalls 317, the sidewalls 317 show a great resistance against yielding with the result that a desired shock-absorbing effect cannot be attained. Furthermore, the buckling of the sidewalls 317 occurs suddenly but not gradually, making it difficult to achieve a smooth shock-absorbing operation.

Some sophisticated bumper beams have an additional sock shock-absorbing member attached to a front side thereof for the purpose of absorbing a relatively small impact force by the bumper beam itself when the vehicle body encounters a minor collision, for example. One example of such bumper beams is disclosed in Japanese Patent Laid-open Publication (JP-A) No. 2004-155313.

The disclosed bumper beam, as shown here in FIG. 18, includes a bumper beam body 321, a shock-absorbing member 322 attached to a front side of the bumper beam body 321, and a bumper face 323 covering the front side of the bumper beam body 321 including the shock-absorbing member 322. The shock-absorbing member 322 is so constructed as to yield or deform when subjected to a relatively small impact force. To this end, the shock-absorbing member 322 has a hollow structure blow-molded from a synthetic resin material such as polypropylene or polyethylene. The hollow shock-absorbing member 322 includes a base portion 324 attached to the bumper beam body 321, a dome-like front portion 325 projecting forward from the base portion 324, and two reinforcement ribs 326, 326 extending from the base portion 324 to the backside of the front portion 325.

With this arrangement, when the bumper beam 320 is subjected to a relatively small impact force at a light or minor collision with an obstacle 329, the reinforcement ribs 326 of the shock-absorbing member 322 serve to hinder smooth yielding or deformation of the dome-like front portion 325. Depending on a direction of collision relative to the obstacle 322, the shock-absorbing member may be subjected to a rotational moment or torque tending to twist the bumper beam body 321 about a joint between itself and the vehicle body. This may result in a deformation or damage on the bumper beam body 321 and an extension member disposed at the joint between the bumper beam body 321 and the vehicle body.

SUMMARY OF THE INVENTION

It is, therefore, an object of the present invention to provide a vehicle bumper beam attachment structure including an extension member which is capable of collapsing smoothly to ensure smooth and efficient shock-absorbing operation when a bumper beam is subjected to an impact force.

Another object of the invention is to provide a vehicle bumper beam attachment structure including a shock-absorbing member attached to the front face of a bumper beam and deformable to absorb a relatively small impact force without involving deformation or damage on the bumper beam or the extension member when the vehicle encounters a light or minor collision with an obstacle.

According to the invention, there is provided a bumper beam attachment structure for a vehicle, comprising: a bumper beam extending in a widthwise direction of the vehicle at a front end or a rear end of the vehicle; and an extension member connected to the bumper beam at a position laterally offset from a longitudinal centerline of a body of the vehicle and adapted to be connected to the vehicle body to attach the bumper beam to the vehicle body. The extension member is formed from an aluminum extruded hollow profile and includes: a rear wall for being in abutment with the vehicle body and having a first end and a second end opposite the first end, the first end being located closer to the longitudinal axis of the vehicle body than the second end does; an inner sidewall extending convexly from the first end of the rear wall toward the bumper beam; a central sidewall extending from a central portion of the rear wall in substantially the same direction as the inner sidewall; a first front wall connecting distal ends of the inner sidewall and the central sidewall and being in contact with the bumper beam; a branched sidewall branched off from the central sidewall and extending convexly toward the bumper beam; an outer sidewall extending from the second end of the rear wall toward the bumper beam; and a second front wall connecting distal ends of the branched sidewall and the outer sidewall and being in contact with the bumper beam.

With this arrangement, when the bumper beam is subjected to an impact force, there is created a rotational moment or torque tending to deform or collapse the extension member at about a junction between the rear wall and the inner sidewall. In this instance, because the inner sidewall and the branched sidewall have curvilinear configurations extending convexly toward the bumper beam, these sidewalls can readily cause buckling or bending in a lateral outward direction away from the longitudinal centerline of the vehicle body. By way of this buckling, the extension member can absorb the impact force to thereby block transmission of the impact force to the vehicle body. Furthermore, because the branched sidewall is branched off from an intermediate portion of the central sidewall, the force acting on the branched sidewall is partly born or retained by the central sidewall. This is effective to protect the vehicle body from damage.

Preferably, the rear wall has an integral end extension projecting outward from the inner sidewall in a lateral inward direction toward the longitudinal centerline of the vehicle body and is adapted for abutment with the vehicle body. By virtue of the end extension projecting from the inner sidewall in a lateral inward direction, the rear wall can retain the force applied via the inner sidewall so that the vehicle body is protected from damage or deformation.

The rear wall and the first and second front walls may have a first thickness, and the inner sidewall, the central sidewall and the branched sidewall have a second thickness, the second thickness being smaller than the first thickness. The sidewalls of a smaller thickness than the rear and front walls can promote yielding or buckling deformation with improved smoothness. Preferably, the second thickness is about two-third of the first thickness.

The bumper beam is preferably formed from an aluminum extruded hollow profile. An extruded hollow profile of aluminum alloy or magnesium alloy can be used in place of the aluminum extruded hollow profile.

The bumper beam attachment structure may further comprise a shock-absorbing member of elongated hollow structure disposed on a front face of the bumper beam with its longitudinal axis extending in the widthwise direction of vehicle for absorbing a relative small impact force applied to the bumper beam. The shock-absorbing member has a flat rear wall attached to the front face of the bumper beam, an arch-shaped front wall extending between upper and lower edge of the rear wall, and two ribs curved arcuately and extending convexly in a branched fashion from a vertical central portion of the rear wall to an inner surface of the arch-shaped front wall.

With this arrangement, when the shock-absorbing member is subjected to a relatively small impact force, the convexly curved ribs arranged to extend in a branched fashion can readily undergo uniform deformation or yielding and do not cause a difference in the amount of yielding between the two ribs. As the uniform yielding of the convexly curved ribs further continues, the shock-absorbing member becomes collapsed to the extent that a central portion of the front wall lies substantially flat in a vertical plane. During that time, the impact force is substantially absorbed through deformation or collapsing of the central portion of the front wall and the curved ribs of the shock-absorbing member. Since the deformed central portion of the front wall is substantially perpendicular to the direction of the impact force, there is no risk to generate a rotational moment or torque tending to tilt the bumper beam upward relative to the vehicle body. Thus, the vehicle body is kept free from deformation or damage.

Preferably, the bumper beam has a hollow structure and includes a reinforcement rib disposed in an internal space of the hollow bumper beam and extending between a front wall and a rear wall of the bumper beam along the length of the bumper beam. The reinforcement rib and the central portion of the rear wall of the shock-absorbing member lie in the same horizontal plane. The reinforcement rib acts to support a base portion of the branched ribs, allowing the ribs to bend or deform smoothly toward the bumper beam when subject to the impact force.

In one preferred form of the invention, the shock-absorbing member has a generally D-shaped cross section. Alternatively, the shock-absorbing member may have a semicircular cross section.

The rear wall, the arch-shaped front wall and the ribs of the shock-absorbing member may have the same thickness. As an alternative, the rear wall and the arch-shaped front wall of the shock-absorbing member may have a first thickness, and the ribs have a second thickness, the second thickness being smaller than the first thickness. The second thickness is preferably about two-thirds of the first thickness. Use of the thinner ribs provides improved smoothness of the shock-absorbing deformation or yielding of the ribs, which enables transmission of the impact force to the bumper beam without causing local stress concentration on the vehicle body.

The shock-absorbing member may be formed from an aluminum extruded hollow profile or molded of a synthetic resin. Furthermore, the rear wall of the shock-absorbing member may be welded or adhesive-bonded to the end face of the bumper beam. Yet, the ribs of the shock-absorbing member may be united together at one end so as to form a straight stem projecting perpendicularly from the vertical central portion of the rear wall, in which instance, a corner formed between the rear wall and the straight stem on each side of the straight stem is preferably rounded.

BRIEF DESCRIPTION OF THE DRAWINGS

A preferred structural embodiment of the present invention will be described in detail herein below, by way of example only, with the reference to the accompanying drawings, in which:

FIGS. 10A and 10B are cross-sectional views illustrative of a problem that may occur due to the structure of a comparative shock-absorbing member when an impact force is applied to a bumper beam attachment structure including the comparative shock-absorbing member;

FIGS. 11A and 11B are cross-sectional views similar to FIGS. 10A and 10B, respectively, but showing operation of the shock-absorbing member according to the invention;

DETAILED DESCRIPTION OF THE PREFERRED EMBODIMENT

Figure 1:
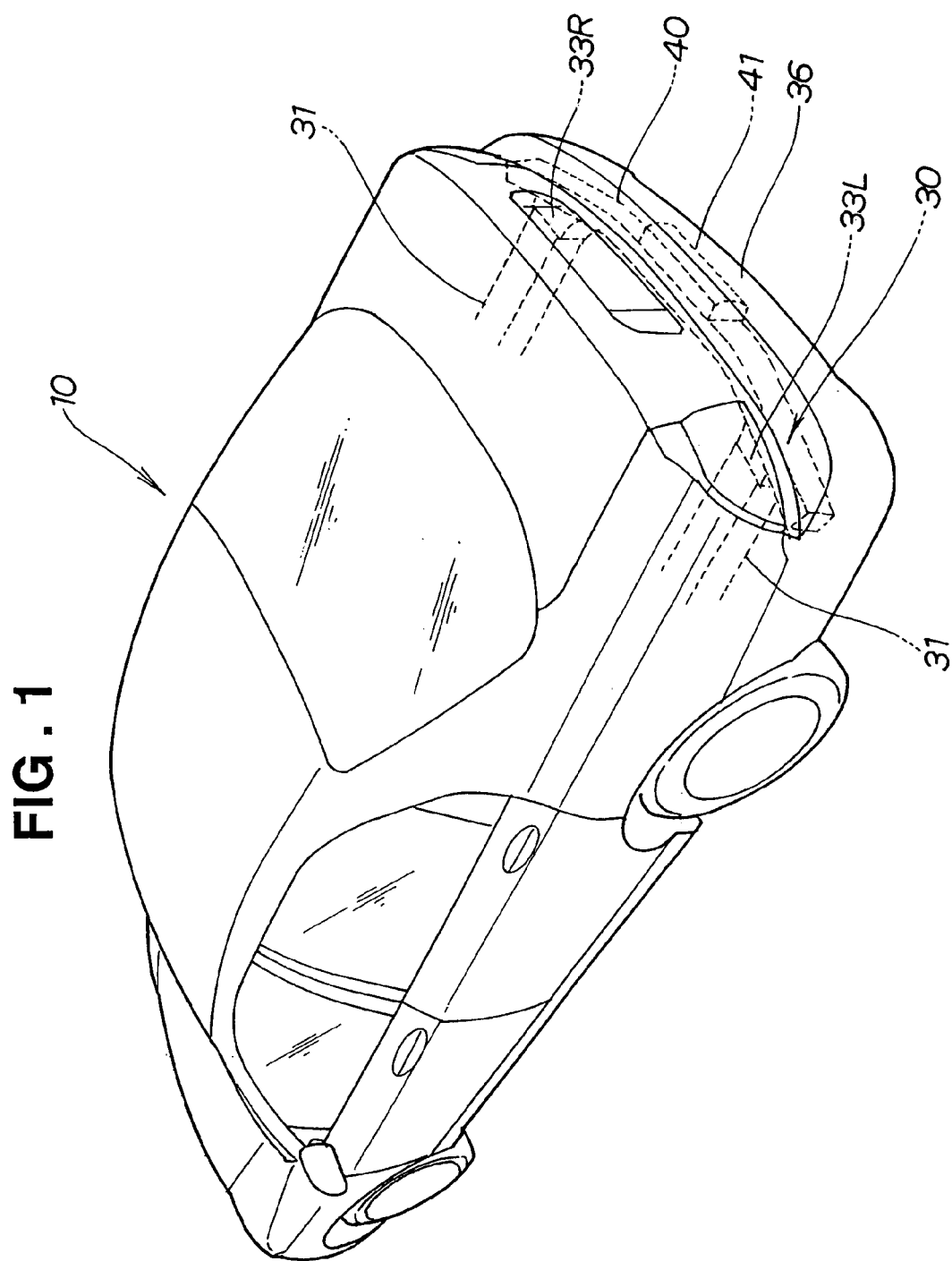
FIG. 1 is a perspective view of a motor vehicle incorporating a bumper beam attachment structure according to the present invention.

Referring now to the drawings and FIG. 1 in particular, there is shown in perspective a motor vehicle 10 incorporating a bumper beam attachment structure 30 according to an embodiment of the present invention. The bumper beam attachment structure 30 generally comprises a bumper beam 40 formed from an aluminum extruded hollow profile and extending in a widthwise direction of the vehicle 10 at a rear end of the vehicle 10, right and left extension members 33R and 33L connected to the bumper beam 40 and adapted to be connected to a body of the vehicle 10 for absorbing an impact force applied to the bumper beam 40 before the impact force is transmitted to the vehicle body, and a shock-absorbing member 41 disposed on a front face of the bumper beam 40 for absorbing a relative small impact force through deformation or collapsing of the shock-absorbing member 41. The bumper beam attachment structure 30 is covered by a rear bumper face 36. Obviously, the bumper beam attachment structure 30 may be employed in a bumper assembly disposed at the front end of the vehicle 10. The extruded hollow profile is also called "extruded hollow shape" or "extruded hollow section".

Figure 2:
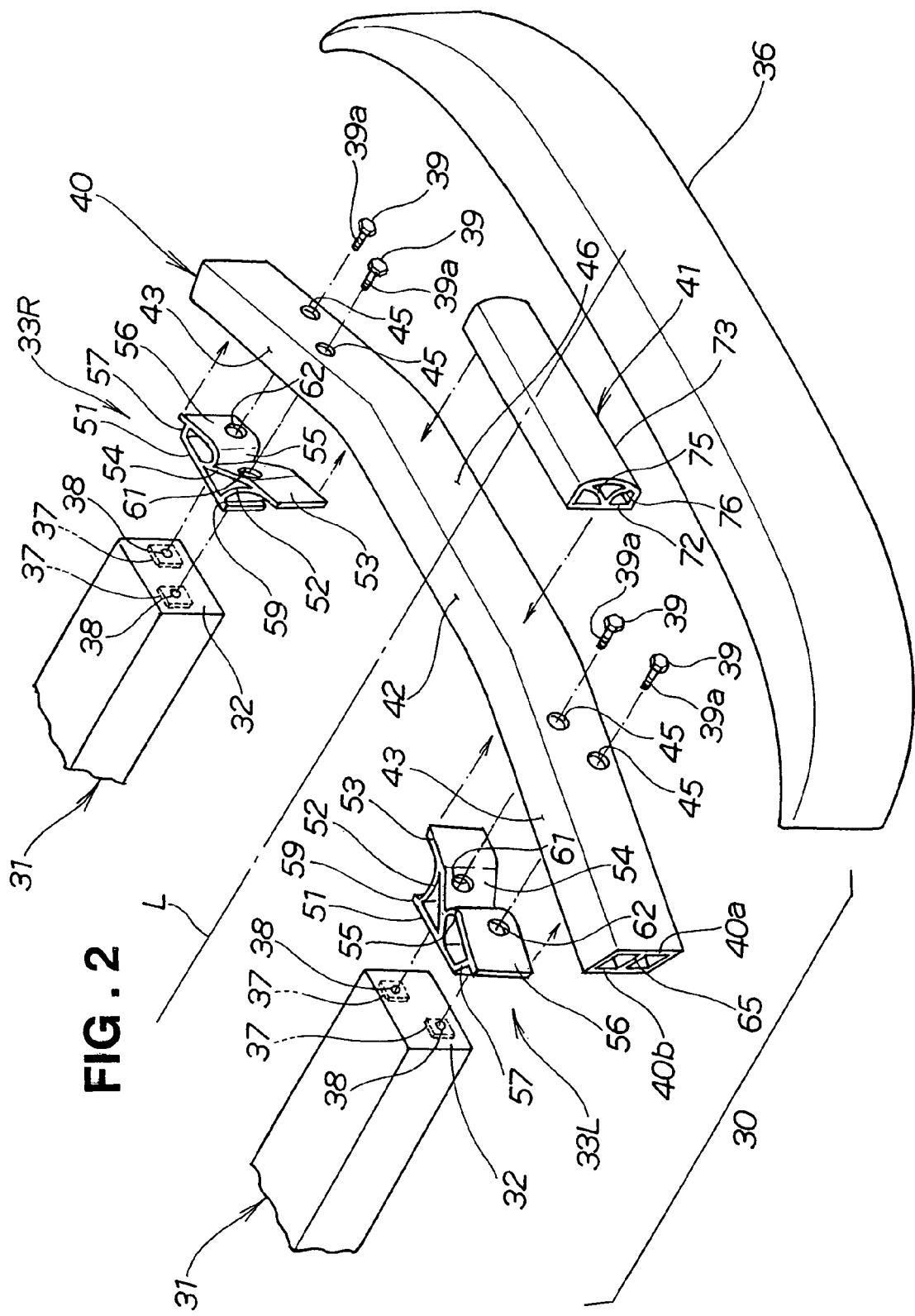
FIG. 2 is an exploded perspective view of the bumper beam attachment structure forming a part of a rear bumper assembly of the motor vehicle.

FIG. 2 is an exploded view showing the relationship between structural components of the bumper beam attachment structure 30 and the vehicle body. As shown in this figure, the bumper beam 40 is attached via the right and left extension members 33R, 33L to respective rear end walls 32, 32 of right and left rear side frames 31, 31 by means of two pairs of bolts 39. The rear side frames 31 form a part of the vehicle body. For attachment to the bumper beam 40, the rear side frames 31 each have a pair of nuts 37 welded to an inner surface of a respective one of the rear end walls 32, and a pair of through-holes 38 formed in each end wall 32 in axial alignment with threaded holes of the nuts 37 for the passage therethrough of threaded shanks 39a of the bolts 39.

The bumper beam 40 formed from an aluminum extruded hollow profile has a straight central portion 42 and opposite end portions 43, 43 bent at an angle to the central portion 42 in a forward direction of the vehicle body. The bumper beam 40 has a front face 46 on which the shock-absorbing member 41 for absorbing a relatively small impact force is disposed at the central portion 42 of the bumper beam 40. The opposite end portions 43, 43 are used for mounting of the extension members 33R, 33L. For this purpose, the end portions 43 each have two holes 45, 45 extending from a front face to a rear face of the respective end portion 43 for the passage therethrough of the bolts 39, 39 when the bumper beam 40 is to be attached via the corresponding extension member 33R, 33L to the rear side frame 31. The bumper beam 40 has a horizontal reinforcement rib 65 disposed centrally in an internal space of the bumper beam 40 and extending along the length of the bumper beam 40. The reinforcement rib 65 is formed integrally with respective vertical central portions of a front wall 40a and a rear wall 40b of the bumper beam 40. The bumper face 36 is molded from a synthetic resin such as polypropylene and has a profile substantially conforming to the profile of the bumper beam 40.

The extension members 33R, 33L are disposed in symmetric relation to one another with respect to a longitudinal centerline L of the vehicle body. The extension members 33R, 33L are formed from an aluminum extruded hollow profile and connected by welding to a rear face of the bumper beam 40 at opposite end portions 43, 43 of the bumper beam 40 such that an axis of extrusion of each extension member 33R, 33L is disposed vertically. Each of the right and left extension members 33R, 33L are connected to the bumper beam 40 at a position laterally offset from the longitudinal centerline L of the vehicle body. The right and left extension members 33R, 33L are identical in structure so that only the left extension member 33L will be described in greater detail with reference to FIG. 3.

Figure 3:
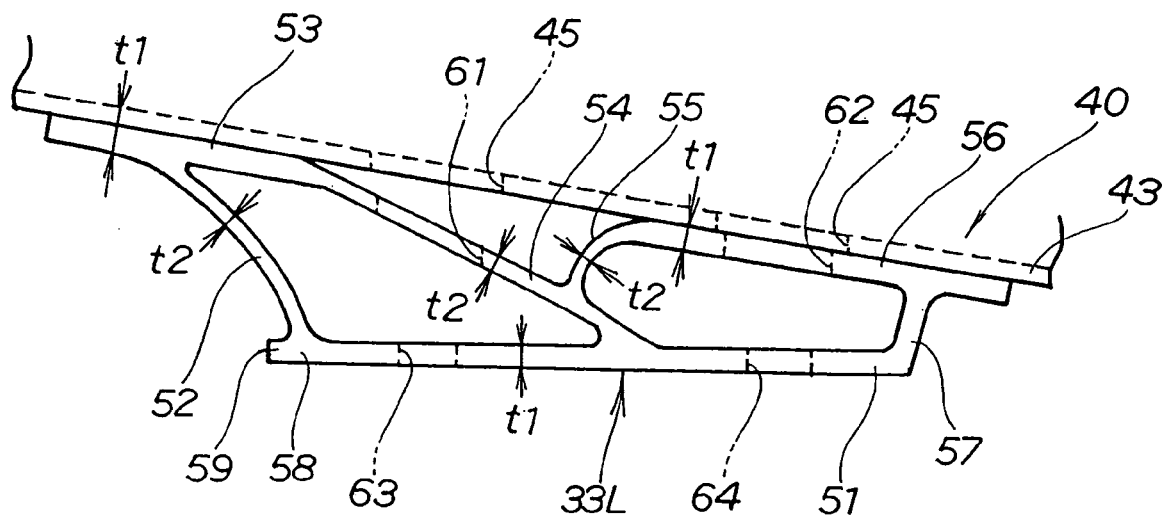
FIG. 3 is a top plan view of a left extension member of the bumper beam attachment structure.

As shown in FIG. 3, the left extension member 33L has a flat rear wall 51 for being in abutment with the end wall 32 (FIG. 2) of the left rear side frame 31, an inner side wall 52 extending convexly from an inner end of the rear wall 51 toward the bumper beam 40, a central side wall 54 extending from a central portion of the rear wall 51 in substantially the same direction as the inner sidewall 52 toward the bumper beam 40, a first front wall 53 connecting distal ends of the inner and central sidewalls 52 and 54 and being in contact with the rear face of the end portion 43 of the bumper beam 40, a branched sidewall 55 branched off from an intermediate portion of the central sidewall 54 and extending convexly toward the bumper beam 40, an outer sidewall 57 extending from an outer end of the rear wall 51 toward the bumper beam 40, and a second front wall 56 connecting distal ends of the branched sidewall 55 and the outer sidewall 57 and being in contact with the bumper beam 40. The inner sidewall 52 is longer than the outer sidewall 57.

The inner end of the rear wall 51 is located closer to the longitudinal centerline L (FIG. 2) than the outer end of the rear wall 51. The rear wall 51 has an integral end extension 59 projecting outward from the inner sidewall 52 in a direction toward the longitudinal centerline L of the vehicle body. The end extension 59 is brought into abutment with the rear end wall 32 (FIG. 2) of the left rear side frame 31 when the bumper beam 40 is attached to the left rear side frame 31 via the left extension member 33L. The convexly curved inner sidewall 52 and the central sidewall 54 are inclined toward the longitudinal centerline L of the vehicle body, while the convexly curved branched sidewall 55 and the outer sidewall 57 are inclined in a direction laterally outward away from the longitudinal center line L of the vehicle body. The first and second front walls 53 and 56 are aligned with each other in a widthwise direction of the vehicle body, and the front walls 53, 56 extend at an angle to the rear wall 51.

The left extension member 33L has two pairs of aligned holes 61, 63 and 62, 64 for attachment to the left rear side frame 31 by the bolts 39. The first pair of holes includes a hole 61 extending through the central sidewall 54 and a hole 63 extending through the rear wall 51. The hole 61 has a larger diameter than the hole 63 and allows passage therethrough of one bolt 39, while the hole 63 allows only passage therethrough of the threaded shank 39a of the same bolt 39 but blocks passage of the bolt 39 as a whole.

Similarly, the second pair of holes includes a hole 62 extending through the second front wall 56 and a hole 64 extending through the rear wall 51. The hole 62 has a larger diameter than the hole 64 and allows passage therethrough of another bolt 39, while the hole 64 allows only passage therethrough of the threaded shank 39$a$ of the bolt 39 and blocks the passage of the bolt 39 as a whole. The first and second front walls 53, 56 are welded to the rear face of the end portions 43 of the bumper beam 40. The rear wall 51 has a thickness t1, and the sidewalls 52, 54 and 55 excepting the outer sidewall 57 have a thickness t2, which is smaller than the thickness t1 of the rear wall 51. This will ensure smooth deformation or collapsing of the sidewalls 52, 54, 56 when the bumper beam 40 is subjected to an impact force. The thickness t2 is preferably about two-thirds of the thickness t1.

Figure 4:
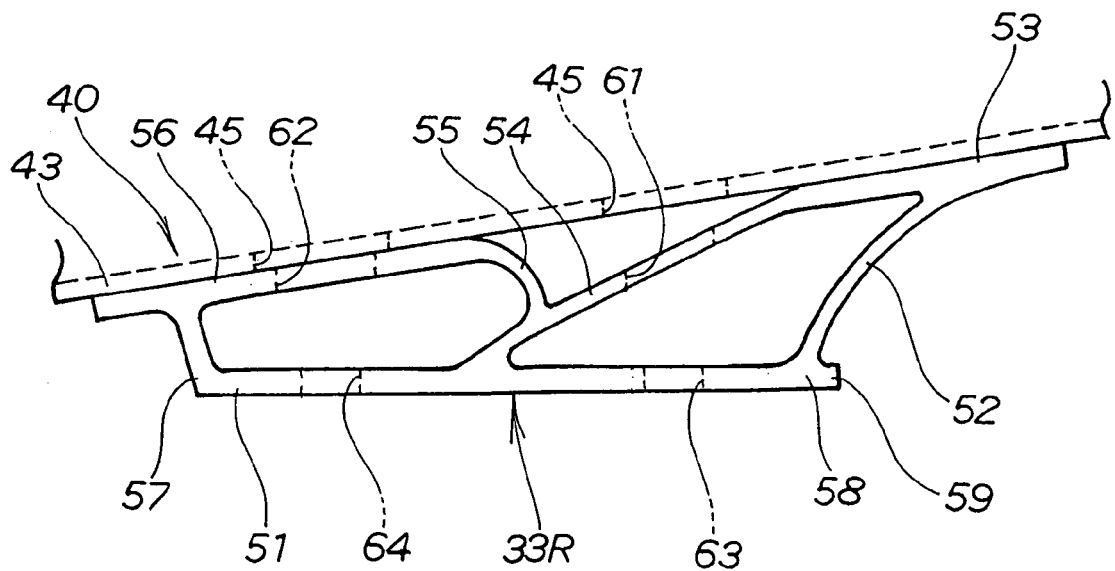
FIG. 4 is a view similar to FIG. 3, but showing a right extension member of the bumper attachment structure.

FIG. 4 shows in plan view the right extension member 33R. As previously described, the right extension member 33R is disposed in symmetric relation to the left extension member 33L with respect to the longitudinal centerline L (FIG. 2) of the vehicle body. Furthermore, the right extension member 33R is identical in structure to the left extension member 33L just described above with reference to FIG. 3. In view of the structural sameness, these parts, which are identical to those shown in FIG. 3 are designated by the same reference characters, and no further description of the right extension member 33R is needed.

Figure 5:
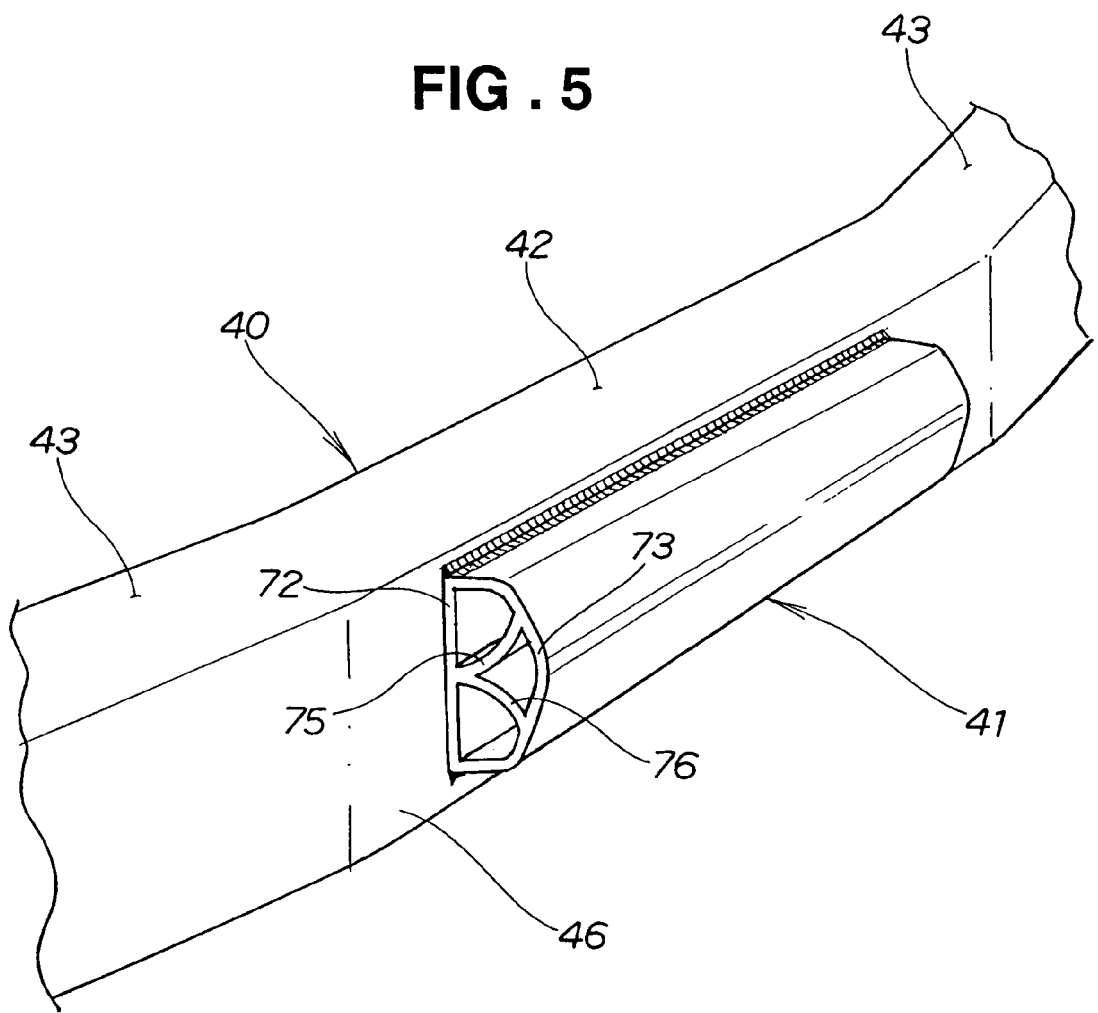
FIG. 5 is a fragmental perspective view of a bumper beam with an impact absorption member mounted on a front face thereof.

As shown in FIG. 5, the shock-absorbing member 41 is formed from an aluminum extruded hollow profile and attached by welding to the front face 46 of the bumper beam 40 at the central portion 42 of the bumper beam 40 such that an axis of extrusion of the shock-absorbing member 41 and an axis of extrusion of the bumper beam 40 extend in the widthwise direction of the vehicle body. The shock-absorbing member 41 is profiled to have a substantially D-shaped cross section of uniform thickness and includes a flat rear wall 72 being in abutment with the front face of the bumper beam 40, an arch-shaped front wall 73 extending between upper and lower edges of the rear wall 72, and two ribs 75 and 76 curved arcuately and extending convexly in a branched fashion from a central portion of the rear wall 72 to an inner surface of the arch-shaped front wall 73.

Figure 6:
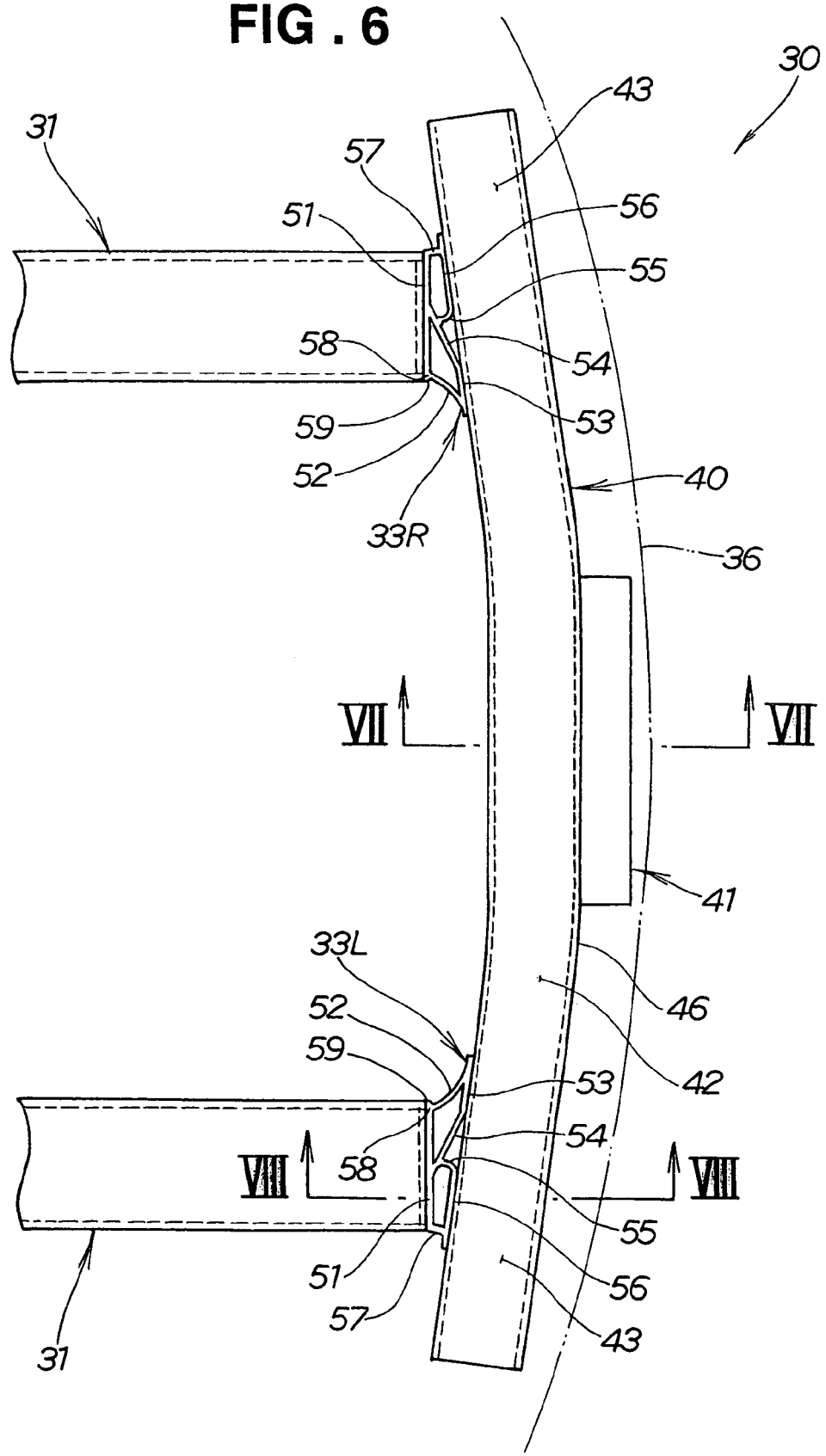
FIG. 6 is a plan view of the bumper beam attachment structure.

FIG. 6 is a plan view showing the bumper beam attachment structure 30 in an assembled condition with the bolts 39 (FIG. 3) omitted for clarity. As shown in this figure, the bumper beam 40 is attached to the rear end of the right and left rear side frames 31, 31 via the right and left extension members 33R, 33L located on opposite end portions 43, 43 of the bumper beam 40 for absorbing an impact force applied to the bumper beam 40 from behind the vehicle body. The shock-absorbing member 41 is attached to the front face 46 of the bumper beam 40 at a central portion of the bumper beam 40 for absorbing a relatively small impact force applied from behind the vehicle body.

Figure 7:
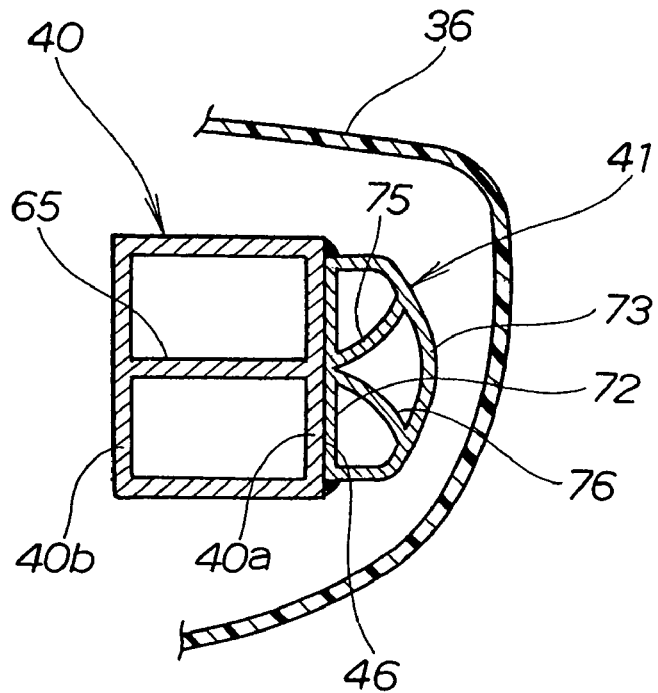
FIG. 7 is a cross-sectional view taken along line VII—VII of FIG. 6.

FIG. 7 is a cross-section taken along line VII—VII of FIG. 6. As shown in this figure, the shock-absorbing member 41 formed from an aluminum extruded hollow profile is attached by welding to the front face 46 of the bumper beam 40 for absorbing a relatively small impact force applied thereto. The convexly curved ribs 75, 76 extend in a branched fashion from the vertical central portion of the rear wall 72 to the inner surface of the arch-shaped front wall 73. The vertical central portion of the rear wall 72 from which the ribs 75, 76 extend lies in the same horizontal plane as the reinforcement rib 65 of the bumper beam 40.

Figure 8:
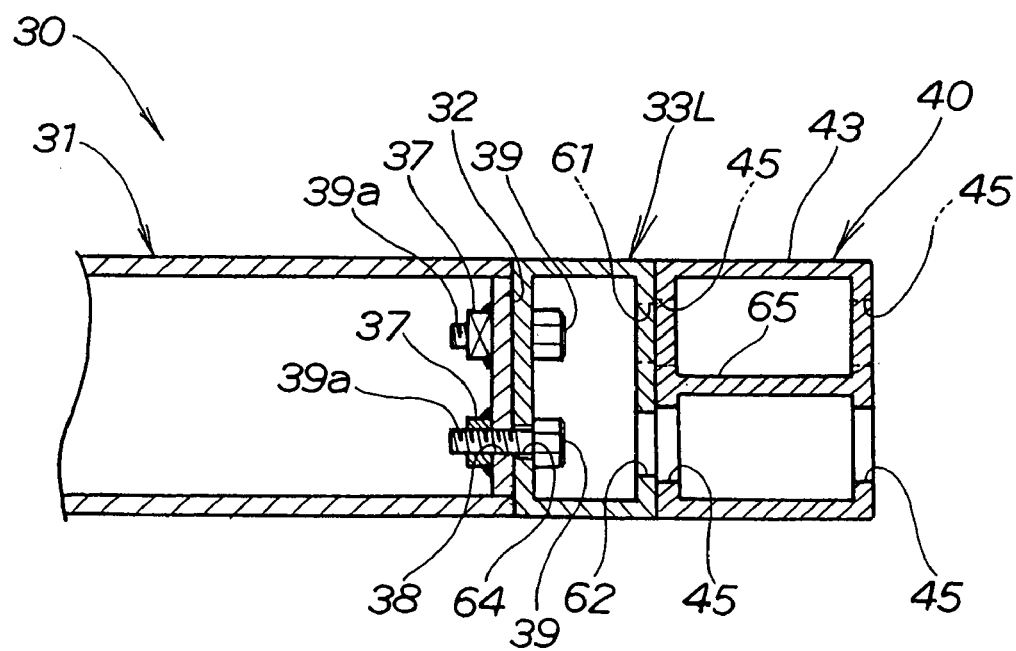
FIG. 8 is a cross-sectional view taken along line VIII—VIII of FIG. 6.

FIG. 8 is a cross-section taken along line VIII—VIII of FIG. 6. As shown in this figure, the left extension member 33L, which is connected by welding to the rear face of the bumper beam 40, is connected to the end wall 32 of the left rear side frame 31 by means of two bolts 39 tightly threaded with the mating nuts 38. The holes 45 formed in the bumper beam 40 have a diameter large enough to allow passage therethrough of the bolts 39. Similarly, the holes 61, 62 formed respectively in the central sidewall 54 (FIG. 3) and the second front wall 56 (FIG. 3) of the extension member 33L have a diameter large enough to allow passage therethrough of the bolts 39. The two holes (only one 64 being shown in FIG. 8) have a diameter larger than a diameter of the threaded shanks 39$a$ of the bolts 39 but smaller than a diameter of enlarged heads of the bolts 39. With the holes 45, 61–64 thus dimensioned, the bolts 39 can be inserted through the bumper beam 40 into the internal space of the extension member 33L and then placed into threaded engagement with the nuts 38. The bumper beam 40 can thus be attached to the rear side frame 31 from the rear side of the vehicle body.

Figure 9A:
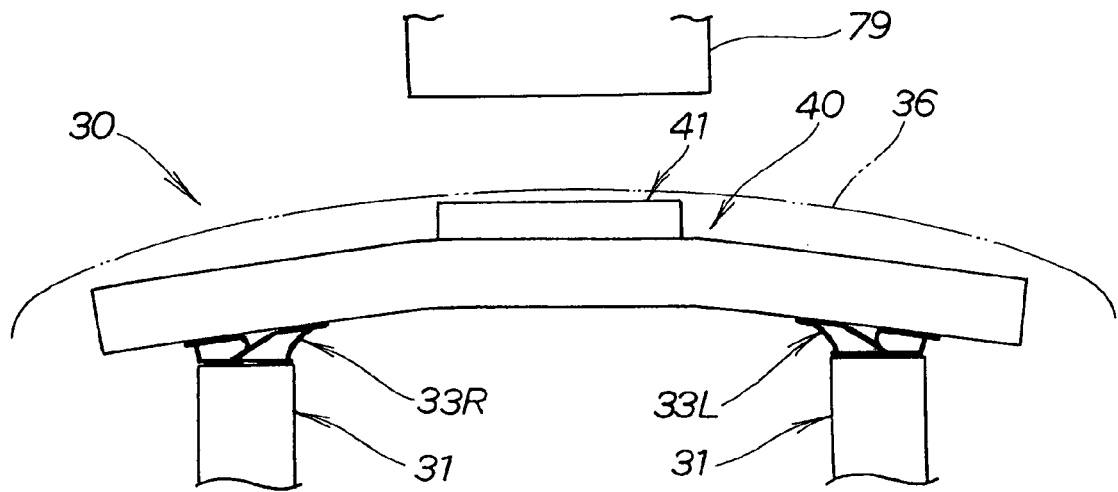
FIGS. 9A to 9C are schematic plan views illustrative of the operation of the bumper beam attachment structure.

Operation of the bumper beam attachment structure 30 will be described below with reference to FIGS. 9A to 9C. FIG. 9A shows a condition in which an obstacle 79 is disposed behind the bumper beam 40 of the bumper beam attachment structure 30. The obstacle 79 may be stationary such as a parked car or a building structure, or in motion such as a succeeding car. In the illustrated embodiment, the obstacle 79 is a succeeding car approaching the own car from behind.

Figure 9B:
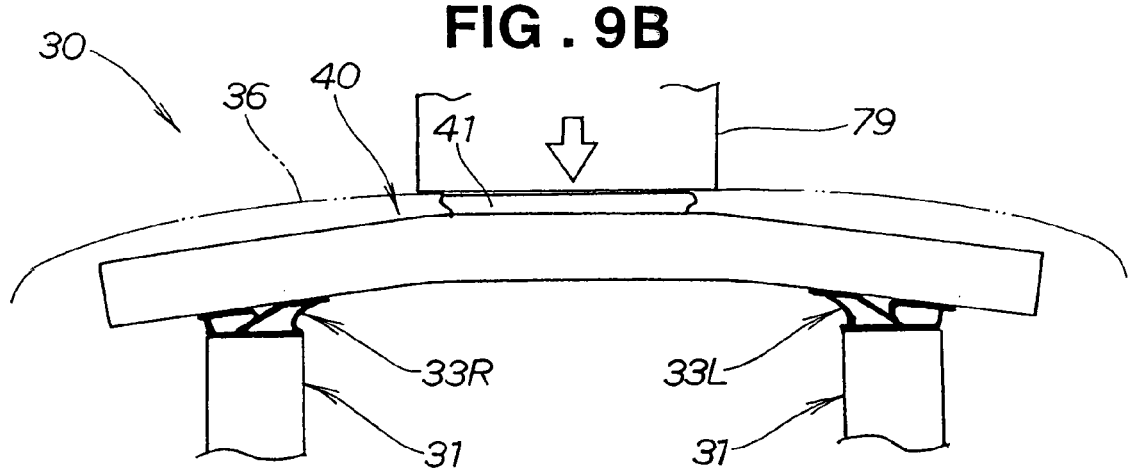

When the succeeding car (obstacle) 79 collides with the rear end of the own car, as shown in FIG. 9B, the shock-absorbing member 41 starts yielding or deforming to thereby absorb an impact force applied thereto. In this instance, if the impact force is relatively small, as experienced at a light or minor collision, the impact force is completely absorbed through deformation or collapsing of the hollow shock-absorbing member 41. Thus, the bumper beam 40 and the extension members 33R, 33L remain unchanged or free from deformation. Since the damage at the minor collision is limited to the shock-absorbing member 41 and the bumper face 36, the bumper beam attachment structure 30 can be repaired merely by replacing the damaged shock-absorbing member 41 and the bumper face 36 with new ones. Such repair requires only a limited cost and does not incur an undue increase in the maintenance cost.

Figure 9C:
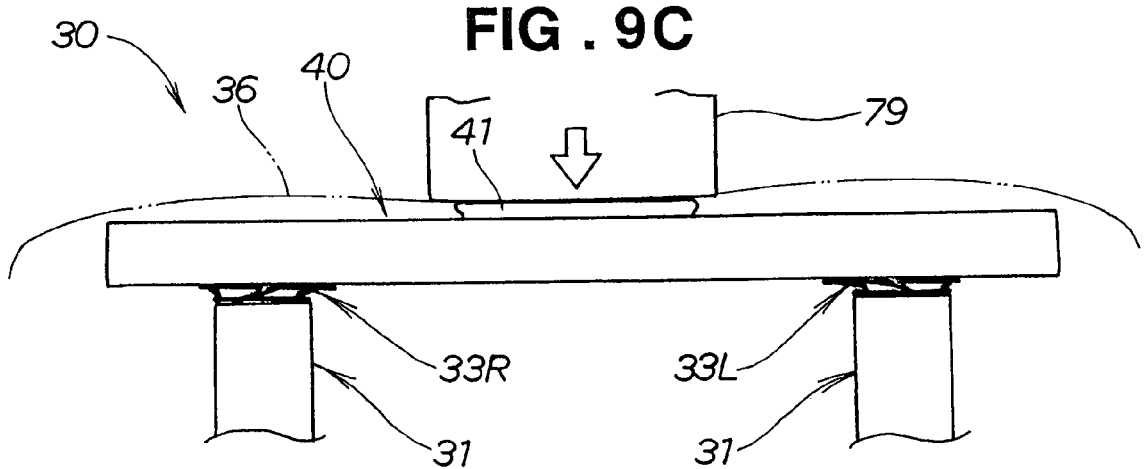

In the case where the rear-end collision between the own car and the succeeding car 79 generates a greater impact force than in the case of minor collision shown in FIG. 9B, shock-absorbing deformation or collapsing of the shock-absorbing member 41 is followed by deformation or yielding of the extension members 33R, 33L, as shown in FIG. 9C. By virtue of the deformation of the extension members 33R, 33L, the impact force is substantially absorbed before it is transmitted to the rear side frames 31. It is therefore possible to keep the rear side frames 31, 31 (i.e., the vehicle body) free from deformation.

FIGS. 10A and 10B are cross-sectional views illustrative of a problem that may occur due to the structure of a shock-absorbing member 241 when a bumper beam attachment structure including the shock-absorbing member 241 is subjected to an impact force. The shock-absorbing member 241 is prepared for comparative purposes and hence will be hereinafter referred to as a "comparative shock-absorbing member". Like the shock-absorbing member 41 of the invention, the comparative shock-absorbing member 241 is formed from an aluminum extruded hollow profile and has a substantially D-shaped cross section. Differing from the inventive shock-absorbing member 41, the comparative shock-absorbing member 241 has only one straight rib 245 disposed horizontally and extending centrally across an internal space of the hollow shock-absorbing member 241. The rib 245 lies in the same plane as the horizontal rib 65 of the bumper beam 40.

When an obstacle such as a succeeding car 79 comes into light or minor rear-end collision with the own car, the comparative shock-absorbing member 241 is subjected to a relatively small impact force, such as indicated by a profiled arrow shown in FIG. 10B. In this instance, because the straight rib 245 of the comparative shock-absorbing member 241 is in alignment with the horizontal reinforcement rib 65 of the bumper beam 65, and because the impact force acts on the front wall 243 in a direction parallel to a common plane of the reinforcement rib 65 and the straight rib 245 (perpendicular to the rear wall 242), the reinforcement rib 65 acts to enhance the rigidity of the rib 245. The thus reinforced rib 245 is now made highly rigid against yielding, so that under the effect of the impact force, the bumper beam 40 as a whole is driven to tilt upward about a joint portion between the bumper beam 40 and the rear side frames 31, as shown in FIG. 10B. With this upward tilting of the bumper beam 40, a local stress concentration occurs at an upper edge of the end wall of each rear side frame 31, which will eventually cause deformation or damaging of the rear side frame 31 the impact force is relatively small.

In the case of the inventive shock-absorbing member 41 shown in FIG. 11A, the convexly curved ribs 75, 76 are not aligned with the reinforcement rib 65 of the bumper beam 40 but extend in a branched fashion to form an angle between each rib 75, 76 and a direction of the impact force. With this arrangement, when an obstacle such as a succeeding car 79 comes into light or minor rear-end collision with the own car, the shock-absorbing member 41 is subjected to a relatively small impact force as indicated by a profiled arrow shown in FIG. 11B. In this instance, since the convexly curved ribs 75, 76 are arranged to extend in a branched fashion, they can readily undergo uniform deformation or yielding and do not cause a difference in the amount of yielding between the two ribs 75, 76. As the uniform yielding of the convexly curved ribs 75, 76 further continues, the shock-absorbing member 41 becomes collapsed to the extent that a central portion of the front wall 73 lies substantially flat in a vertical plane, as shown in FIG. 11B. During that time, the impact force is substantially absorbed through deformation or collapsing of the central portion of the front wall 73 and the curved ribs 75, 76 of the shock-absorbing member 41. Since the deformed central portion of the front wall 73 is substantially perpendicular to the direction of the impact force, there is no risk to generate a rotational moment or torque tending to tilt the bumper beam 40 upward relative to the rear side frame 31. Thus, the rear side frame 31 is kept free from deformation or damage.

Figure 12A:
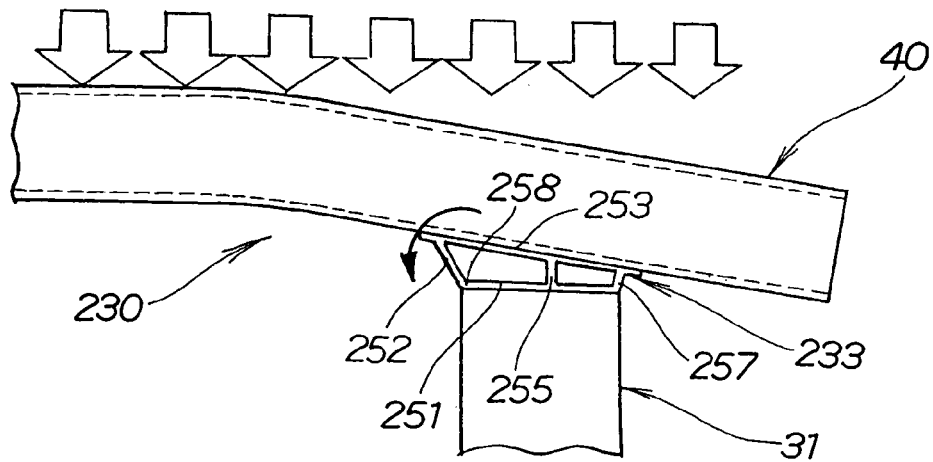
FIGS. 12A to 12C are schematic plan views illustrative of a problem that may occur due to the structure of a comparative extension member when an impact force is applied to a bumper beam attachment structure including the comparative shock-absorbing member.
Figure 12B:
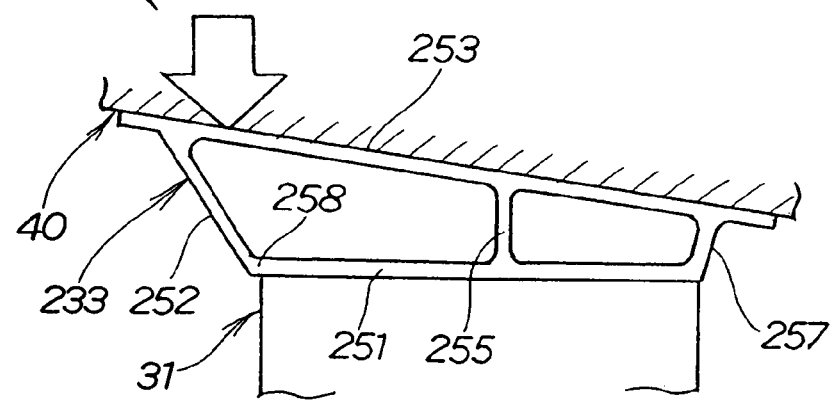
Figure 12C:
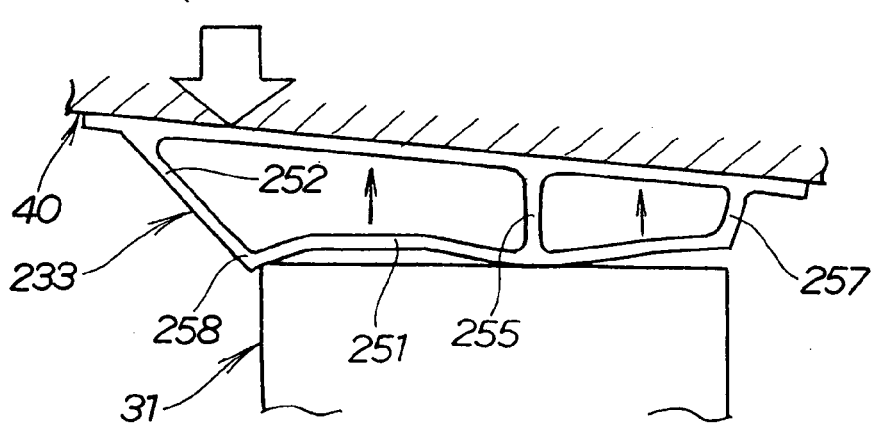

FIGS. 12A to 12C are schematic plan views illustrative of a problem that may occur due to the structure of an extension member 233 when an impact force (indicated by profiled arrows) is applied to a bumper beam attachment structure 230 including the comparative shock-absorbing member 233. The extension member 233 is prepared for comparative purposes and hence will be hereinafter referred to as a "comparative extension member". Like the extension members 33R, 33L of the invention shown in FIGS. 2 to 4, the comparative extension member 233 is formed from an aluminum extruded hollow profile and includes a rear wall 251 adapted to be connected to the rear end of a rear side frame 31. Differing from the inventive extension members 33R, 33L, the comparative extension member 233 includes an inner sidewall 252 extending rectilinearly from an inner end of the rear wall 251 toward the bumper beam 40 and inclined toward a longitudinal centerline (not shown but identical to the one L shown in FIG. 2) of the vehicle body, a central sidewall 255 extending perpendicularly from a central portion of the rear wall 251 toward the bumper beam 40, an outer sidewall 257 extending rectilinearly from an outer end of the rear wall 251 and inclined in a direction laterally outward away from the longitudinal centerline of the vehicle body, and a front wall 253 interconnecting distal ends of the inner, central and outer sidewalls 252, 255, 257 and connected by welding to a rear face of the bumper beam 40.

With this arrangement, when the bumper beam 40 is subjected to an impact force as indicated by profiled arrows shown in FIG. 12A, there is created a rotational force or torque (indicated by the arrow) tending to deform or collapse the comparative extension member 233 at about a junction 258 between the rear wall 251 and the inner sidewall 252. In this instance, because the inner sidewall 252 of rectilinear configuration shows a relatively high resistance to deformation or yielding, it occurs that the inner sidewall 252 tilts down in a lateral inward direction (left-hand direction in FIGS. 12A and 12B) while the original shape of a corner at the junction 258 remains unchanged, as shown in FIG. 12C. Due to the tilting of the inner sidewall 252, the rear side frame 31 may be damaged by the corner at the junction 258 between the inner sidewall 252 and the rear wall 251. Furthermore, the central sidewall 255 extending perpendicular to an end face of the rear side frame 31 is hardly to become deformed under the effect of the impact force. As a result, the impact force is transmitted via the central sidewall 255 to the rear side frame 31, causing local deformation or damage on the rear side frame 31. Additionally, the rear wall 251 of the shock-absorbing member 233 is deformed to assume such a configuration that a portion extending between the inner sidewall 252 and the central sidewall 255 and a portion extending between the central sidewall 255 and the outer sidewall 257 are bent outward toward the bumper beam 40. It appears clear that the comparative extension member 233 cannot achieve a desired shock-absorbing operation without involving damage on the rear side frame 31.

Figure 13A:
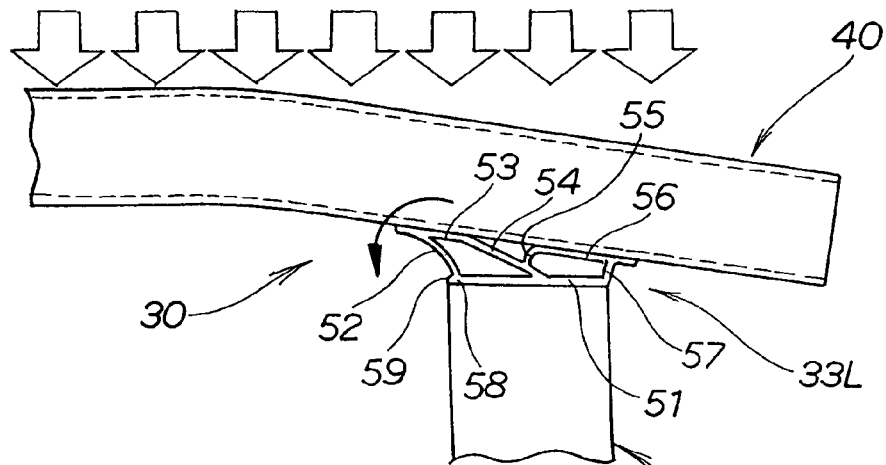
FIGS. 13A to 13C are plan views similar to FIGS. 12A to 12C, respectively, but showing operation of the extension member according to the invention.
Figure 13B:
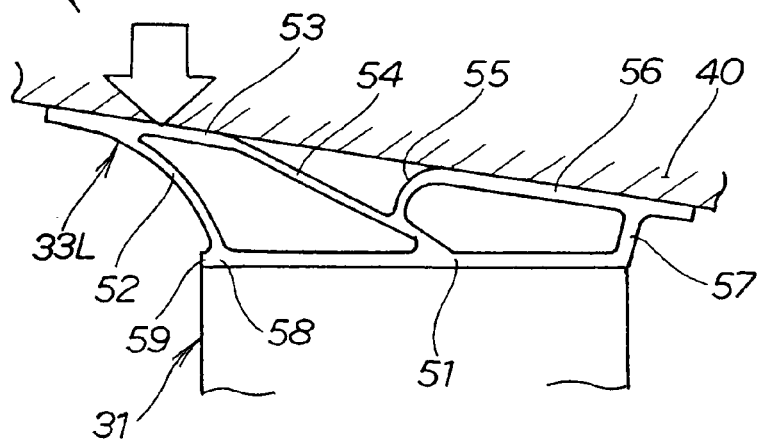

In the case of the inventive extension member 33L, as shown in FIGS. 13A and 13B, the inner sidewall 52 has a curvilinear configuration extending convexly from an inner end of the rear wall 51, the central sidewall 54 extends from a central portion of the rear wall 51 in substantially the same direction as the inner sidewall 52 toward the bumper beam 40, and distal ends of the inner sidewall 52 and the central sidewall 54 are connected together by the first front wall 53. Furthermore, the branched sidewall 55 branched off from an intermediate portion of the central sidewall 54 has a curvilinear configuration extending convexly toward the bumper beam 40, the outer sidewall 57 extends from an outer end of the rear wall 51 toward the bumper beam 40, and distal ends of the branched sidewall 55 and the outer sidewall 57 are connected together by the second front wall 56. The rear wall 51 has an end extension 59 projecting outward from the inner sidewall 52 in a lateral inward direction toward the longitudinal centerline (not shown but identical to the one L shown in FIG. 2) of the vehicle body. The end extension 59 of the rear wall 51 is also in abutment with the end face of the rear side frame 31.

Figure 13C:
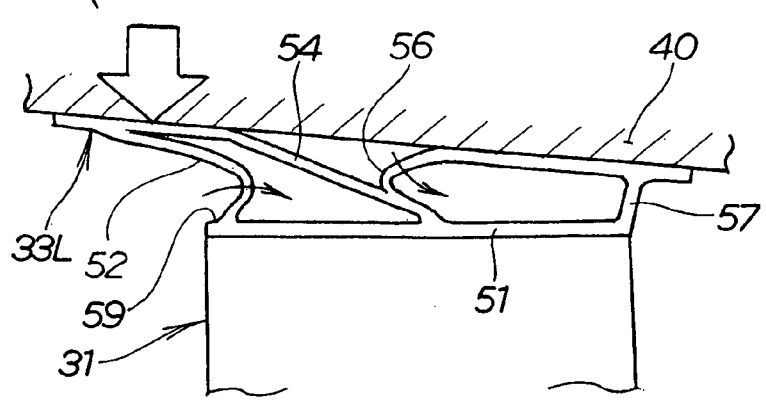

With this arrangement, when the bumper beam 40 is subjected to an impact force as indicated by profiled arrows shown in FIG. 13A, there is created a rotational force or torque (indicated by the arrow) tending to deform or collapse the inventive extension member 33L at about a junction 58 between the rear wall 51 and the inner sidewall 52. In this instance, because the inner sidewall 52 and the branched sidewall 55 have curvilinear configurations extending convexly toward the bumper beam 40, the sidewalls 52, 55 can readily cause buckling or bending in a lateral outward direction, as indicated by the arrows shown in FIG. 13C. By way of this buckling, the extension member 33L can absorb the impact force to thereby block transmission of the impact force to the rear side frame 31. Furthermore, owing to the end extension 59 projecting from the inner sidewall 52 in a lateral inward direction, the rear wall 51 can retain the force applied via the inner sidewall 52. By thus providing the end extension 59, it is possible to protect the rear side frame 31 from damage or deformation. Additionally, because the branched sidewall 55 is branched off from an intermediate portion of the central sidewall 54, the force acting on the branched sidewall 55 is partly retained by the central sidewall 54. This is also effective to avoid damage which would otherwise occur at the rear side frame 31.

Figure 14:
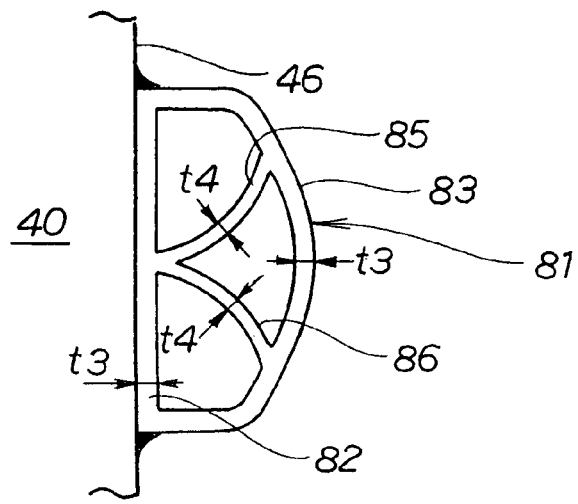
FIG. 14 is an end view of a modified shock-absorbing member according to the invention.
Figure 15:
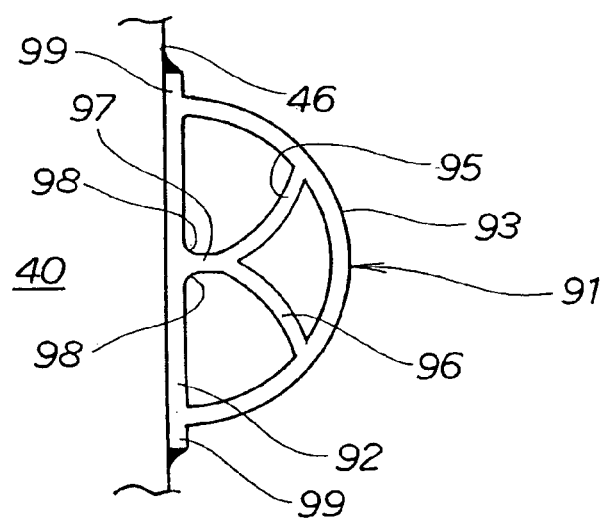
FIG. 15 is an end view of another modified shock-absorbing member according to the invention.
Figure 16:
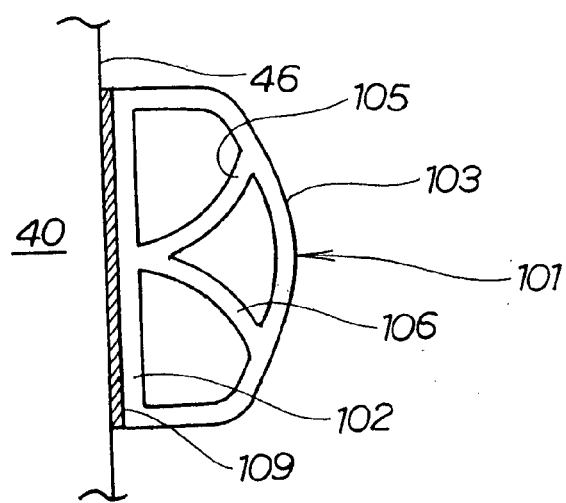
FIG. 16 is an end view of still another modified shock-absorbing member according to the invention.
Figure 17:
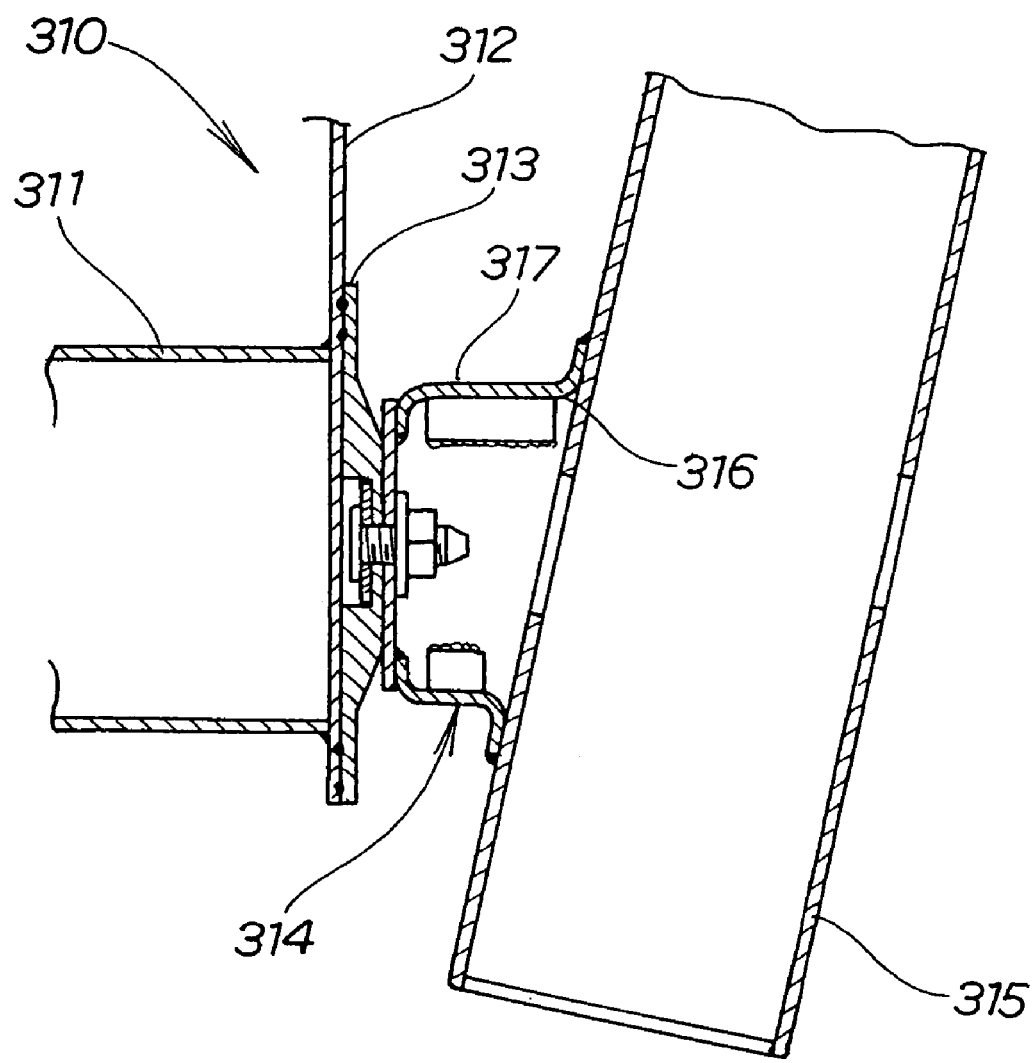
FIG. 17 is a cross-sectional view showing a conventional bumper beam attachment structure.
Figure 18:
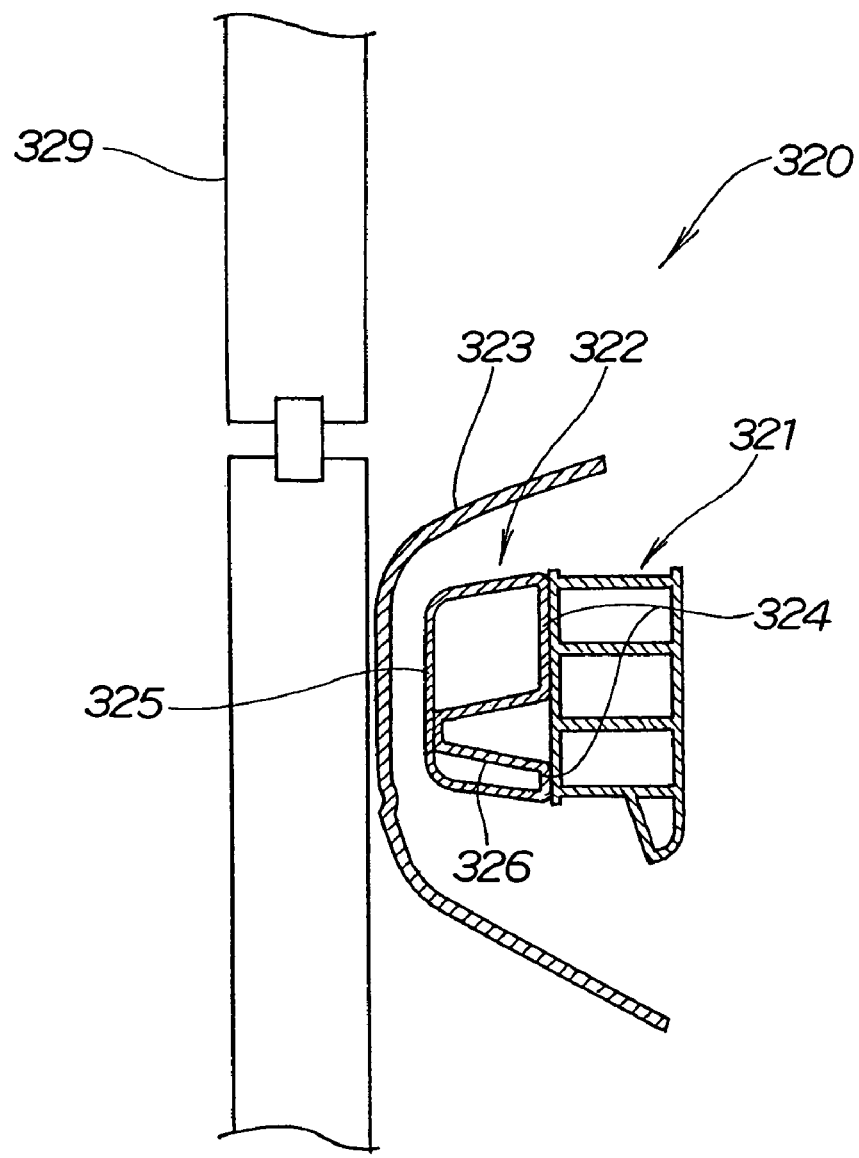
FIG. 18 is a cross-sectional view showing the structure of a conventional shock-absorbing member attached to a front face of the bumper beam.

FIGS. 14 to 16 show modified forms of the shock-absorbing member according to the invention. The first modified shock-absorbing member 81 shown in FIG. 14 differs from the shock-absorbing member 41 of FIG. 7 only in that a rear wall 82 and an arch-shaped front wall 83 have a thickness t3 which is different from a thickness t4 of two convexly curved ribs 85, 86. The thickness t4 of the ribs 85, 86 is smaller than the thickness t3 of the rear and front walls 82, 83 and preferably about two-thirds of the thickness t3. By thus setting the thickness t4 of the ribs 85, 86 relative to the thickness t3 of the rear and front walls 82, 83, it is possible to promote the bending of the ribs 85, 86 more smoothly than the shock-absorbing member 41 of uniform thickness. This will insure transmission of the impact force from a perpendicular direction to the bumper beam with improved reliability.

The second modified shock-absorbing member 91 shown in FIG. 15 differs from the shock-absorbing member 41 of FIG. 7 in that the cross-sectional shape is semi-circular rather than D-shaped. Furthermore, a rear wall 92 and an arch-shaped front wall 93 are joined together so that opposite end edges of the rear wall 92 project outward from base portions of the front wall 93 and form longitudinal flanges 99, 99. Two ribs 95 and 96 extending in branched fashion from a central portion of the rear wall 92 to an inner surface of the arch-shaped front wall 93 are united together at one end so as to form a straight stem 97 projecting perpendicularly from the central portion of the rear wall 92. Corners formed between the straight stem 97 and the rear wall 72 and located at opposite sides of the straight stem 97 are rounded. The modified shock-absorbing member 91 having a semi-circular cross section is more susceptible to deformation than the shock-absorbing member 41 of D-shaped cross section. Furthermore, the rounded corners 98 at a junction between the stem 97 and the rear wall 92 act to minimize the effect of an impact force that may be transmitted via the stem 97 to the bumper beam 40 when the branched ribs 95, 96 undergo deformation. This will prevent a local deformation from occurring at the bumper beam 40. By providing the longitudinal flanges 99, 99, it is possible to improve welding distortion involved in a weld connection between the rear wall 92 and the bumper beam 40.

The third modified shock-absorbing member 101 shown in FIG. 16 differs from the shock-absorbing member 41 of FIG. 7 only in that the shock-absorbing member 101 is molded from a synthetic resin such as polypropylene or polyethylene into a hollow structure including a flat rear wall 12, an arch-shaped front wall 103 extending between opposite end edges of the rear wall 102, and two ribs 105, 106 curved arcuately and extending convexly in a branched fashion from a central portion of the rear wall 102 to an inner surface of the arch-shaped front wall 103. The resin-molded shock-absorbing member 101 is attached by bonding to the bumper beam 40 with an adhesive layer 109 disposed between the rear wall 102 of the shock-absorbing member 101 and a front face 46 of the bumper beam 40. The adhesive layer 109 may comprise a two-sided adhesive tape. The shock-absorbing member 101 attached by bonding to the bumper beam 40 can be replaced easily as compared to the shock-absorbing members 41, 81, 91 attached by welding to the bumper beam 40. This will improve the maintenance efficiency and cost.

Although in the illustrated embodiment, the extension members 33R, 33L is formed from an aluminum extruded hollow profile, an extruded hollow profile of aluminum alloy or magnesium alloy can be used to form the extension members 33R, 33L. Furthermore, the aluminum extruded hollow profile used for forming the bumper beam 40 may be replaced with an extruded hollow profile of aluminum alloy or magnesium alloy. Alternatively, the aluminum extruded hollow profile used for forming the shock-absorbing members 41, 81, 91 can be replaced with an extruded hollow profile of aluminum alloy or magnesium alloy.

Obviously, various minor changes and modifications are possible in the light of the above teaching. It is to be understood that within the scope of the appended claims the present invention may be practiced otherwise than as specifically described.

What is claimed is:

1. A bumper beam attachment structure for a vehicle, comprising:
   a bumper beam extending in a widthwise direction of the vehicle at a front end or a rear end of the vehicle; and
   an extension member connected to the bumper beam at a position laterally offset from a longitudinal centerline of a body of the vehicle and adapted to be connected to the vehicle body to attach the bumper beam to the vehicle body,
   wherein the extension member is formed from an aluminum extruded hollow profile and includes:
   a) a rear wall for being in abutment with the vehicle body and having a first end and a second end opposite the first end, the first end being disposed a first distance from the longitudinal axis of the vehicle body and the second end being disposed a second distance from the longitudinal axis of the vehicle body, said first distance being smaller than said second distance;
   b) an inner sidewall extending convexly from the first end of the rear wall toward the bumper beam;
   c) a central sidewall extending from a central portion of the rear wall in substantially the same direction as the inner sidewall;
   d) a first front wall connecting distal ends of the inner sidewall and the central sidewall and being in contact with the bumper beam;
   e) a branched sidewall branched off from the central sidewall and extending convexly toward the bumper beam;
   f) an outer sidewall extending from the second end of the rear wall toward the bumper beam; and g) a second front wall connecting distal ends of the branched sidewall and the outer sidewall and being in contact with the bumper beam.

2. The bumper beam attachment structure according to claim 1, wherein the rear wall has an integral end extension projecting outward from the inner sidewall in a lateral inward direction toward the longitudinal centerline of the vehicle body and is adapted for abutment with the vehicle body.

3. The bumper beam attachment structure according to claim 1, wherein the rear wall and the first and second front walls have a first thickness, and the inner sidewall, the central sidewall and the branched sidewall have a second thickness, the second thickness being smaller than the first thickness.

4. The bumper beam attachment structure according to claim 3, wherein the second thickness is about two-thirds of the first thickness.

5. The bumper beam attachment structure according to claim 1, wherein the bumper beam is formed from an aluminum extruded hollow profile.

6. The bumper beam attachment structure according to claim 1, further comprising a shock-absorbing member of elongated hollow structure disposed on a front face of the bumper beam with its longitudinal axis extending in the widthwise direction of the vehicle for absorbing a relative small impact force applied to the bumper beam, wherein the shock-absorbing member has a flat rear wall attached to the front face of the bumper beam, an arch-shaped front wall extending between an upper and a lower edge of the rear wall, and two ribs curved arcuately and extending convexly in a branched fashion from a vertical central portion of the rear wall to an inner surface of the arch-shaped front wall.

7. The bumper beam attachment structure according to claim 6, wherein the bumper beam has a hollow structure and includes a reinforcement rib disposed in an internal space of the hollow bumper beam and extending between a front wall and a rear wall of the bumper beam along the length of the bumper beam, the reinforcement rib and the central portion of the rear wall of the shock-absorbing member lie in the same horizontal plane.

8. The bumper beam attachment structure according to claim 7, wherein the bumper beam is formed from an aluminum extruded hollow profile.

9. The bumper beam attachment structure according to claim 6, wherein the shock-absorbing member has a generally D-shaped cross section.

10. The bumper beam attachment structure according to claim 6, wherein the shock-absorbing member has a semicircular cross section.

11. The bumper beam attachment structure according to claim 6, wherein the rear wall, the arch-shaped front wall and the ribs of the shock-absorbing member have the same thickness.

12. The bumper beam attachment structure according to claim 6, wherein the rear wall and the arch-shaped front wall of the shock-absorbing member have a first thickness, and the ribs have a second thickness, the second thickness being smaller than the first thickness.

13. The bumper beam attachment structure according to claim 12, wherein the second thickness is about two-thirds of the first thickness.

14. The bumper beam attachment structure according to claim 6, wherein the shock-absorbing member is formed from an aluminum extruded hollow profile.

15. The bumper beam attachment structure according to claim 14, wherein the bumper beam is formed from an aluminum extruded hollow profile.

16. The bumper beam attachment structure according to claim 6, wherein the shock-absorbing member is molded of a synthetic resin.

17. The bumper beam attachment structure according to claim 16, wherein the bumper beam is formed from an aluminum extruded hollow profile.

18. The bumper beam attachment structure according to claim 6, wherein the rear wall of the shock-absorbing member is welded to the end face of the bumper beam.

19. The bumper beam attachment structure according to claim 18, wherein the shock-absorbing member has rear wall upper and lower flanges integral with and projecting outward from the upper and lower edges of the rear wall.

20. The bumper beam attachment structure according to claim 6, wherein the rear wall of the shock-absorbing member is adhesive-bonded to the end face of the bumper beam.

21. The bumper beam attachment structure according to claim 6, wherein the ribs are united together at one end so as to form a straight stem projecting perpendicularly from the vertical central portion of the rear wall, and the shock-absorbing member has two rounded corners formed between the rear wall and the straight stem on opposite sides of the straight stem.

* * * * *